March 27, 1934. A. VOORDERMAN 1,952,300

EGG CASE COVER

Filed July 29, 1932

Inventor
Arend Voorderman
By Lynn H. Latta
Attorney

Patented Mar. 27, 1934

1,952,300

UNITED STATES PATENT OFFICE 1,952,300

EGG CASE COVER

Arend Voorderman, Sioux Center, Iowa

Application July 29, 1932, Serial No. 625,729

6 Claims. (Cl. 217—56)

My invention relates to a cover for egg cases or other similar types of containers, which can be installed without the necessity of nailing to the case.

An object of my invention is to provide a metal weather resisting cover, which can be installed in a very short time and which is of a maximum strength.

A further object of my invention is to provide such a cover, which cannot be jarred loose during shipment of a case and which will also insure an absence of shock to the eggs contained within the case.

A further object of my invention is to provide a metal cover of sufficient strength, which will eliminate the necessity for a wooden cover usually used, which has a pronounced tendency to warp and which wooden cover, in case of a few nails being loosened, will cause damage to the eggs contained within the case.

Another object of my invention is to provide a cover which insures a tight fit as well as a slightly overlapping fit to prevent the entrance of rain or sun and spoiling the quality of the eggs in the case.

A further object of my invention is to provide a device, which will absorb all types of shock and which will have a tendency to automatically tighten itself on the case in the presence of vibration or jars.

A further object of my invention is to accomplish these various results with a construction of which is simple and easy of manufacture.

With these and other objects in view, my invention consists in the construction, arrangement, and combination of the various parts of my device, whereby the objects contemplated are attained, as hereinafter more fully set forth, pointed out in my claims, and illustrated in the accompanying drawing, in which:

Figure 1:
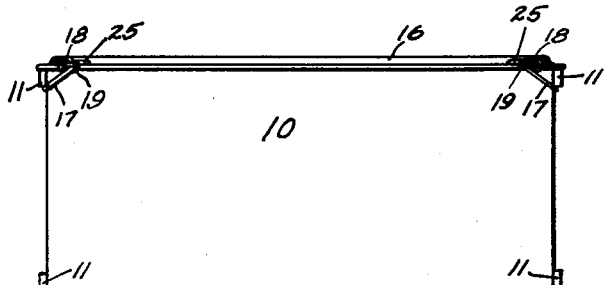
Figure 1 is a side elevation of an egg case with my type of cover attached.
Figure 2:
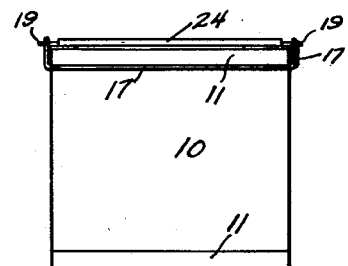
Figure 2 is an end view of the same.
Figure 3:
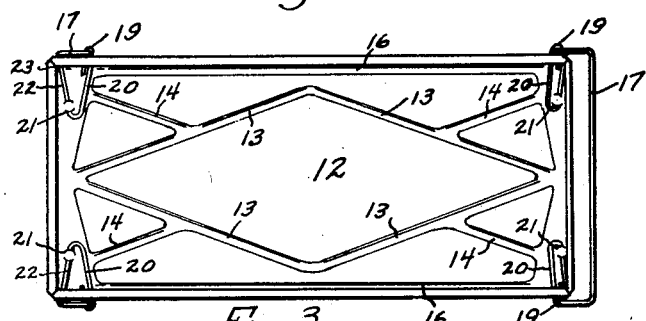
Figure 4:
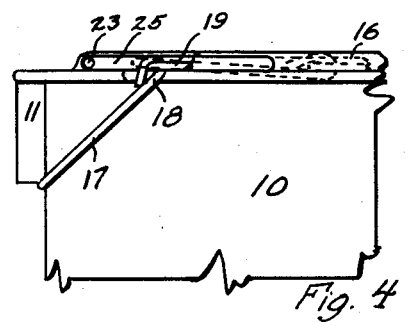
Figure 5:
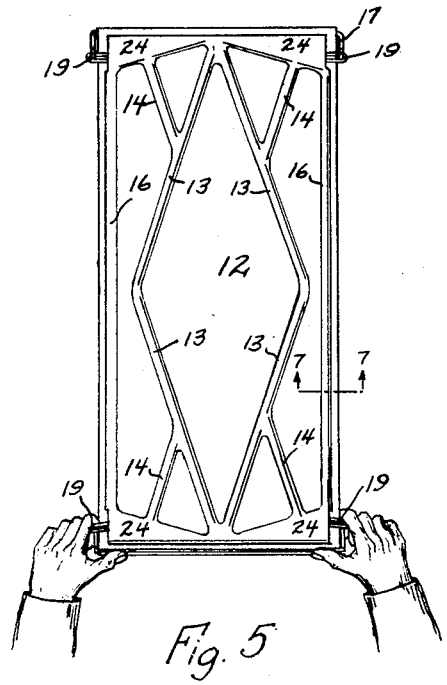
Figure 6:
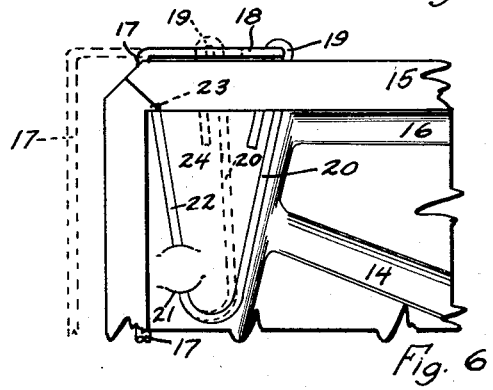
Figure 7:
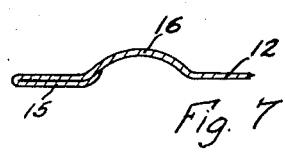

Figure 3 is a bottom view of the cover with one of the clamping members extended, Figure 4 is an enlarged detail view of a corner of Figure 1, Figure 5 is a plan view of the cover on the case, showing how it is put in position with the hands, Figure 6 is an enlarged detail view of the spring arrangement, and Figure 7 is an enlarged sectional view of part of the lid taken along the lines 7—7 of Figure 5.

I have used the reference character 10 to designate generally the egg case. This egg case usually includes the transverse wooden strips 11.

My cover will be designated generally by the character 12. This cover is made of fairly stiff sheet steel or other suitable material, which is suitably galvanized or coated to protect it from the elements.

This cover includes the stamped out ribs 13 and 14, which insure a maximum amount of strength for the cover.

To further stiffen the cover, I provide a bent-back flange 15, (see Figure 7), which extends generally in the shape as shown around the perimeter of the cover. This feature provides for a maximum amount of stiffening where the cover is applied to the case, so that there can be no twisting or torsional effects, which would tend to distort the shape of this cover.

The flange 15 merges, as shown, with the two principal ribs 16. All of these ribs are merely integral parts of the lid, but are pressed outwardly in a manner well known in the art, and in this way, the cover retains the feature of great strength.

The clamps for clamping the lid to the case are formed of suitably strong and heavy wire and comprise the generally broadened U-shaped members 17, which include the loops 18 at their ends.

These loops are engaged with the further elongated loops 19. (See Figure 4.)

The loops 19 are an extension of the spring element 20, which is secured to the lid through the punched out opening at 21.

The spring element 20 is bent backwardly and terminates in the integral extension 22, which ends approximately at 23. (See Figures 3 and 6.)

The spring wire 20 is made of fairly high grade spring wire, which will insure a constant spring action.

The entire spring is housed within the upstruck portions 24, which are situated in the four corners of the lid and which portions are flush with the tops of all the ribs on the cover.

The spring action of the spring 20 takes place within the slots 25. (See Figures 1 and 4.) The inner end 23 of the spring is positioned at the end of the slot and extends slightly outwardly so that it will not slip out of place.

In clamping the cover to the case, first one of the U-shaped members 17 is placed under the strip 11, then (see Figure 5) the fingers of the hand, as shown, are placed over the extending loops 19, and the lower broadened part of the U-shaped member 17, which normally rests beneath or over the lid, will be drawn backwardly and allowed to drop under the other strip 11 on the other side of the case. The resulting tension due to the spring action against these members and the different angularity thus effected, will then keep the cover firmly attached on the top of the case.

Figure 3 shows the position of the U-shaped clamping member in its normal position on the left hand side of the figure, and the right hand side of the figure shows the spring depressed and under tension with the clamping member 17 in position to be dropped underneath the strip 11 of the case.

Figure 6 also shows the two positions of the spring member and the clamping member; the solid lines showing the normal position and the dotted lines when the associated spring and clamp are pulled towards the operator.

I have found that this type of cover operates very efficiently in preventing breakage of eggs. The usual type of wooden cover, which must be nailed in place, will generally warp and be otherwise thrown out of position, due to loosening of the nails during transportation and so forth. This releases the pressure on the eggs contained in the case, as a result they are subject to shock and damage and also to other influences such as the elements, which results in the spoilage of the eggs.

Eggs are practically always crated in the usual paper containers and are then padded with suitable padding at the top of the case, and it is very essential that this padding be kept under a firm and uniform pressure. It will be seen that the lid of my construction retains its uniform strength throughout by the method of ribbing, which I have employed, and the constant spring tension exerted at the ends of the case, which cannot slip out of place due to its form, will insure a constant pressure on the upper padding of the egg cases and will eliminate the feature of breakage and the other faults mentioned herebefore.

It will be seen also that I have devised a cover of this type which can be used generally on other types of boxes or cases and which can be installed in a very short time, thus eliminating the necessity of all the time necessary in nailing on the usual type of cover.

Furthermore vibration or shock in the usual type of lid will gradually reduce the strength of the nailed joints, which will tend to become loosened, thus rendering the case subject to undesirable influences. Whereas in my construction, the very nature of the spring controlled elements will cause an effect of gradual tightening as the case is subject to successive shocks. There will be a tendency of the spring elements to seat themselves more firmly each time the case is subjected to a jar or vibration.

It will be also seen that I have provided for all of these features mentioned, in a construction which is simple and economical and which can be manufactured at a minimum cost.

Some changes may be made in the construction and arrangement of the parts of my invention without departing from the real spirit and purpose of my invention, and it is my intention to cover by my claims any modified forms of structure or use of mechanical equivalents, which may be reasonably included within their scope.

I claim as my invention:

1. An egg case cover comprising a ribbed sheet metal plate, and tension means for retaining the plate on an egg case, including a pair of looped spring wire elements positioned at each end of the plate, each loop being at a corner thereof, and U-shaped clamping members attached to the spring elements.

2. An egg case cover comprising a ribbed sheet metal plate, means for retaining the plate on an egg case, including a pair of looped spring wire elements positioned at each end of the plate, each loop being at a corner thereof, and U-shaped clamping members attached to the spring elements, and means for manually compressing the spring wire elements.

3. In an egg case cover, a pair of U-shaped members adapted to be retained under the upper end cleats of an egg case, and tension means attached to the U-shaped members and the cover, including looped spring wire elements, including outwardly extending portions to be grasped by the fore-fingers of the hand when the lid is to be clamped to a case.

4. An egg case cover comprising a sheet metal plate, means for retaining the plate on an egg case under tension including tension means attached to the corners of the plate, and U shaped clamping members attached to the tension means.

5. An egg case cover comprising a cover plate, means for retaining the plate on an egg case under tension including tension means attached to the plate, a U shaped clamping member attached to the tension means, said tension means adapted to allow any desired angular retention of the U shaped member with respect to the plate.

6. An egg case cover plate including tension means attached thereto, means attached to the tension means adapted to be retained under an egg case cleat, said tension means adapted to allow varying angularity of the cleat retention means to allow retention beneath varying sizes of cleats.

AREND VOORDERMAN.